Aug. 9, 1927.

G. W. NORDSTRUM 1,638,271

ANTIFRICTION BEARING

Filed Jan. 5, 1924

Witness:
A. J. Sauser.

Inventor:
George W. Nordstrum,
By Samuel N. Pond
Atty.

Patented Aug. 9, 1927.

1,638,271

UNITED STATES PATENT OFFICE.

GEORGE W. NORDSTRUM, OF CHICAGO, ILLINOIS.

ANTIFRICTION BEARING.

Application filed January 5, 1924. Serial No. 684,469.

This invention relates to anti-friction bearings and has reference more particularly to a new and improved ball retaining and spacing ring, mainly designed for use in thrust bearings. A known form of such ring consists of a flat sheet metal annulus formed with uniformly spaced round holes of less diameter than the balls through which the latter project on one side, and outer and inner peripheral flanges or lips on said annulus which overhang the balls sufficiently to prevent their escape on the other side. These flanges or lips, as heretofore made, have only a point bearing on the balls which rapidly wears with use and not infrequently allows the balls to become unevenly spaced, unduly loose in their seats in the ring, and sometimes escape from the latter and crowd against each other. The flanges or lips also sometimes become bent outwardly from their correct positions in relation to the balls, and in that way permit the latter to escape.

The general object of my present invention is to provide an improved anti-friction bearing which shall effectively overcome the above-noted faults of the known construction. More specific objects are, to provide a spacing and retaining ring wherein the flanges or lips shall have a line bearing, instead of a mere point bearing, on the balls, to provide such a spacing and retaining ring wherein such line bearing of the flange on the ball shall extend in the direction of travel of the latter whereby it more effectively holds the balls in accurate spaced relation, and to provide a construction which will afford stiffer and stronger flanges or lips than in constructions previously known.

These and other attendant objects and advantages of the invention will be apparent to persons skilled in the art as the same becomes better understood by reference to the following detailed description, taken in connection with the accompanying drawings in which I have illustrated one practical embodiment of the principle of the invention, and wherein—

Figure 1:
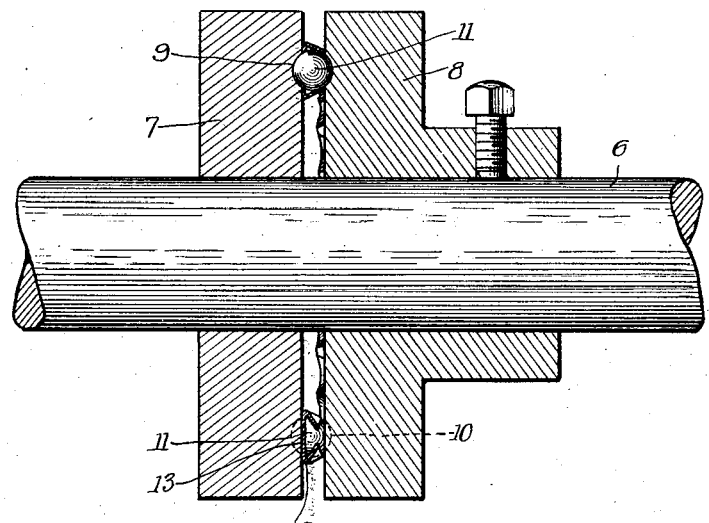
Fig. 1 is a diametric sectional view of a thrust bearing embodying my invention.
Figure 2:
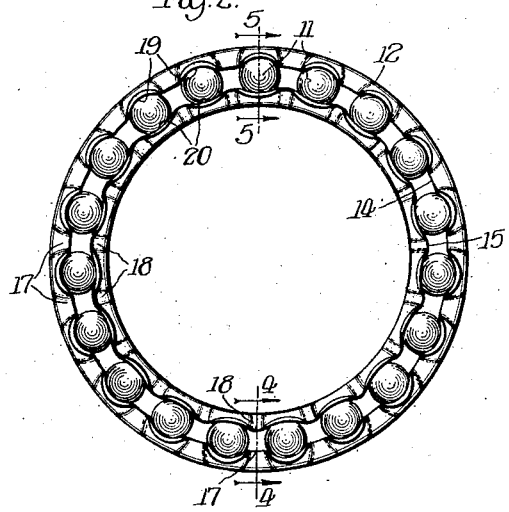
Fig. 2 is a side elevation of the assembled balls and ball retaining and spacing ring.
Figure 3:
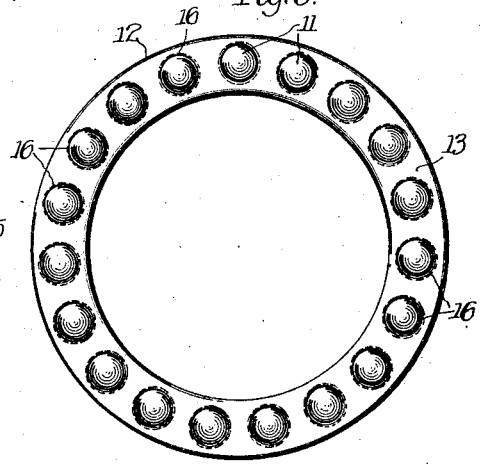
Fig. 3 is a view similar to Fig. 2, showing the other side of the ring.
Figure 4:
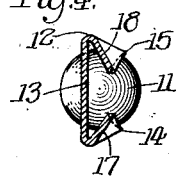
Figure 5:
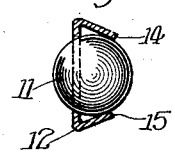

Figs. 4 and 5 are enlarged cross-sections on the lines 4—4 and 5—5, respectively, of Fig. 2.

Referring to the drawings, 6 designates a shaft equipped with my improved thrust bearing, and 7 and 8 designate the stationary and rotating halves of the bearing formed in their proximate faces with the usual channel race-ways 9 and 10 respectively for the group of steel balls 11.

12 designates as an entirety my improved ball retaining and spacing ring. This is a one-piece structure, cut and swaged to finished form from sheet metal, and comprises a flat annulus 13 and outer and inner laterally and inwardly extending peripheral flanges or lips 14 and 15 respectively. The flat annulus or web portion 13 of the ring is formed with a series of uniformly spaced holes 16 of less diameter than the balls 11 forming seats for the latter, through which seats the balls project, as clearly shown in Figs. 4 and 5, into rolling contact with the race-way 9. The outer and inner flanges 14 and 15 overhang the balls some distance beyond the common plane of their centers so as to confine the balls on that side, and between the free edges of said flanges the balls project into rolling contact with the race-way 10.

By reference to Figs. 4 and 5 it will be observed that the flanges 14 and 15 form acute angles with the flat web 13 of the ring and are transversely flat so that they touch the surfaces of the balls only at the inner corners of their free edges. As previously stated, this has heretofore produced only a point contact of the flanges with the balls, which, in service, soon wears down to such an extent as to produce an undesirably loose fit of the balls in the ring and sometimes to allow the balls to escape from their seats. How to obviate this consistently with simplicity and economy of structure has been the main problem which the present invention seeks to solve. In carrying out my invention, I swage inwardly, by suitable tools, those portions of the flanges 14 and 15 which lie between adjacent balls. The inwardly swaged portions of the outer flange 14 are designated by 17, and the corresponding inwardly swaged portions of the inner flange 15 are designated by 18. This inward swaging of the flanges is preferably performed after the balls have been assembled in the ring, with the result that the free edge portions of the flanges overlying the balls between adjacent swaged portions 18 are bent into line contact with the balls, as shown at 19 and 20 in Fig. 2, such line contact extending in the direction of travel of the balls. This effects two pronounced advantages as regards the spacing and retention of the balls in the ring. In the first place it holds the balls much more securely against escape outwardly or laterally of the ring from between the two flanges; and in the second place it holds adjacent balls securely against crowding toward each other in the direction of their path of travel. A still further important advantage of the described construction flows from the fact that the corrugating of the flanges, produced by the inward swaging of the portions between adjacent balls, greatly stiffens and strengthens the flanges, making them much less likely to become accidentally spread or otherwise deformed with consequent failure to properly hold and space the balls.

I have herein shown and described an embodiment of the invention which in practice has been found to satisfactorily effectuate the stated purposes and objects thereof. Manifestly minor changes of form and structure may be resorted to without departing from the principle of the invention or sacrificing any of the advantages thereof. Hence I reserve all such variations and modifications as fall within the spirit and purview of the appended claim.

I claim—

In an anti-friction thrust bearing, the combination with a group of balls, of a retaining and spacing ring therefor comprising a flat annulus formed with spaced holes of smaller diameter than said balls and seating the latter, and flanges of flat transverse section continuous at their bases with the outer and inner edges of said annulus and extending inwardly toward each other at acute angles to the plane of said annulus and overhanging said balls, said flanges having inwardly swaged portions between adjacent balls and at their free edges forming line contacts with the latter extending in the direction of travel of said balls.

GEORGE W. NORDSTRUM.